United States Patent
Watanabe et al.

[11] Patent Number: 5,846,670
[45] Date of Patent: Dec. 8, 1998

[54] GAS DIFFUSION ELECTRODE FOR ELECTROCHEMICAL CELL AND PROCESS OF PREPARING SAME

[75] Inventors: Masahiro Watanabe, No. 2-10, Kitashin 1-chome, Kofu-shi, Yamanashi; Kazunori Tsurumi; Noriaki Hara, both of Kanagawa, all of Japan

[73] Assignees: Tanaka Kikinzoku Kogyo K.K.; Masahiro Watanabe, both of Japan

[21] Appl. No.: 858,898

[22] Filed: May 19, 1997

Related U.S. Application Data

[63] Continuation of Ser. No. 344,738, Nov. 23, 1994, abandoned, which is a continuation-in-part of Ser. No. 19,746, Feb. 19, 1993, abandoned.

[30] Foreign Application Priority Data

Feb. 21, 1992 [JP] Japan ..................................... 4-72484

[51] Int. Cl.$^6$ .............................. H01M 4/29; H01M 4/88
[52] U.S. Cl. .................................. 429/42; 429/12; 429/40
[58] Field of Search ..................................... 429/12, 40, 42

[56] References Cited

U.S. PATENT DOCUMENTS

| | | | |
|---|---|---|---|
| 4,017,663 | 4/1977 | Breault | 429/12 |
| 4,177,159 | 12/1979 | Singer | 427/115 |
| 4,500,647 | 2/1985 | Solomon | 502/101 |
| 4,647,359 | 3/1987 | Lindstrom . | |
| 4,748,095 | 5/1988 | Furuya et al. . | |
| 4,877,694 | 10/1989 | Solomon et al. . | |
| 4,894,355 | 1/1990 | Takeuchi et al. | 427/115 |
| 5,137,754 | 8/1992 | Watanabe . | |
| 5,217,821 | 6/1993 | Landsman et al. | 429/42 |
| 5,312,701 | 5/1994 | Khasin et al. | 429/42 |

OTHER PUBLICATIONS

M. Watanabe et al., "New Wet–proof Technique of Gas–diffusion Electrodes", Chemistry Letters, The Chemical Society of Japan, No. 7, Jul. 1991, pp. 1113–1116.
Watanabe et al., 1986, J. Electroanalytical Chem. 197:195–208 (month not available).

*Primary Examiner*—Kathryn L. Gorgos
*Assistant Examiner*—Carol Chaney
*Attorney, Agent, or Firm*—Klauber & Jackson

[57] ABSTRACT

Disclosed are a gas diffusion electrode for an electrochemical cell which comprises a catalyst layer formed by binding, by means of poiytotrafluoroethylene, catalyst-supporting carbon black and catalyst-non-supporting carbon black having a fluorinated polyolofine film on substantially whole surface, the catalyst layer being integrated on a substrate, and a process of preparing same.

Since the carbon black employed for the formation of the gas network in the catalyst layer of the gas diffusion electrode having the above constitution in accordance with the present invention is completely hydrophobically treated, no electrolyte permeates this portion and the carbon black exhibits high hydrophobicity so that the wet-proofing is maintained even after the long operation period to enable the gas supply to the catalyst particles so as to provide the gas diffusion electrode with a long life and high electrode performances.

5 Claims, 6 Drawing Sheets

GAS DIFFUSION ELECTRODE FOR ELECTROCHEMICAL CELL AND PROCESS OF PREPARING SAME

This Application is a Continuation of application Ser. No. 08/344,738, filed Nov. 23, 1994, now abandoned, which is a continuation-in-part of application Ser. No. 08/019,746, filed Feb. 19, 1993, now abandoned.

BACKGROUND OF THE INVENTION

The present invention relates to a gas diffusion electrode for such an electrochemical cell as a fuel cell employing liquid as an electrolyte such as a phosphoric acid type fuel cell and a process of preparing same.

A phosphoric acid type fuel-cell is formed by the integration of a unit cell, for example as shown in FIG. 1, by disposing a pair of gas diffusion electrodes 2,2', that is, an porous anode (negative pole) and a cathode (positive pole) on the respective sides of an electrolyte 1 prepared by impregnating a porous matrix formed by binding silicon carbide with a small amount of fluorine resin with liquid phosphoric acid, and further disposing on the rear of the respective gas diffusion electrodes 2,2' two separators equipped with ribs (initerconnectors having grooves) 3,3' functioning as a current collector and a gas supplier.

The conventional anode and cathode are the gas diffusion electrodes which include a porous semi-hydrophobic catalyst layer prepared by thermally binding catalyst supported on carbon black and hydrophobic polytetrafluoroethylene (hereinafter referred to as "PTFE") mixed in the form of its dispersion to a supporting layer such as carbon paper. FIG. 2 is an enlarged schematic view of the porous catalyst layer. A Pt catalyst (b) in contact with an electrolyte shown in FIG. 2 participates in an olectrode reaction. In order to rapidly carryout the catalytic reaction, a sufficient supply of a reaction gas (c) to the Pt catalyst (b) is indispensable. The hydrophobic PTFE (e) mixed in the form of the its dispersion as a binding agent of the carbon black which supports catalysts (hereinafter referred to as "catalyst-supporting carbon black") forms a gas supply network to the Pt catalyst (b) by means of its hydrophobicity. In other words, a space functioning as a gas supply path it formed among the PTFE particles. In order to assure sufficient gas supplying ability, the addition of a sufficient amount of the hydrophobic PTFE is required.

However, the excessive addition of PTFE (e) increases the number of particles of the Pt catalyst (b) which are not in contact with tho electrolyte (a) to lower the utilization of the Pt catalyst particles. As a result, the a reduction in the initial performance takes place. As long as the conventional electrode structure is employed, increases in the catalyst utilization and the gas supplying ability are contradictory to each other, and the improvement of the electrode initial and life performance by the optimization of the amount of PTFE added may be limited.

In order to improve these prior art drawbacks, the separation of the function of the catalyst layer has been proposed [J. Electroanalytical Chemistry, Vol. 197, P195–208 (1986)]. The catalyst structure shown therein is schematically illustrated in FIG. 3. This structure is formed by pressing and sintering two kinds of powder of the catalyst-supporting carbon black (d) and carbon black (f) which supports no catalysts (hereinafter referred to as "non-catalyst-supporting carbon black") for implementing the separation of the two functions of the catalyst layer, i.e. electrolyte network and gas network. Since no PTFE (o) is present at the portion of the catalyst-supporting carbon black (d), it exhibits perfect hydrophilicity (network function for electrolyte) so that even the 100% utilization of the Pt catalyst (b) particles may be realized. Since the amount of PTFE (e) added to the non-catalyst-supporting carbon black containing no catalyst particles in the powder can be increased in comparison to the normal catalyst layer, a more perfect gas supply network may be formed. It is demonstrated in the above literature, J. Electroanalytical Chemistry, that by optimizing the ratio of the catalyst-supporting carbon black (d) to the non-catalyst-supporting carbon black (f), not only the optimization of the ratio of the electrolyte network to the gas supply network but also improved well gas permeability can be attained.

However, even in the above technology newly proposed as well as in the conventional technology, the lowering of the gas supplying ability with operational time due to the permeation of the electrolyte into the gas supply network acts to lower the electrode performances. It is known especially in the conventional technology that an abrupt lowering of performances takes place after 10,000 to 20,000 hours of operation. This is because the particle size of PTFE (e) employed is about ton times that of the carbon black (g) as schematically shown in FIG. 4. Since the carbon surface which is likely to be wetted with the electrolyte cannot be completely covered with the particles of PTFE (e), the electrolyte may permeate into this portion to prevent the gas supply from reaching the catalyst particles and cause an abrupt decrease of the electrode performances. In order to overcome these problems, a method of providing complete hydrophobicity to the carbon black (g) has been developed which comprises covering the carbon black (g) with a thin layer of hydrophobic fluorine resin film (h) [Chemistry Letters, P1113–1116 (1991), U.S. Pat. No. 5,137,754].

As this hydrophobic fluorine resin film, fluorinated polyolefine such as fluorinated polyethylene may be employed. Carbon blacks having a fluorine resin film on substantially whole surfaco thereof may be prepared by impregnating the carbon black directly with polyolefins such as polyethylene or its solution to form a polyolofins (polyethylene) film on the surface and then fluorinating the polyolefin (polyethylene) film to produce the above fluorinated polyolefin (polyethylene) film, In this connection, the non-catalyst-supporting carbon black having the said fluorinatod polyolefin film on its surface may he referred to as FPO/CB, and the non-catalyst-supporting carbon black having the fluorinated polyethylene film on its surface may be referred to as FPE/CB.

SUMMARY OF THE INVENTION

It is an object of the present invention to provide a gas diffusion electrode for such an electrochemical cell as a fuel coll having a long life and high performance and a process of preparing same.

It is another object of the present invention to provide a gas diffusion electrode for a fuel cell having a long life and high performance which can be realized by employing carbon black of complete hydropholbicity, and a process of preparing same.

The present invention is a gas diffusion electrode for an electrochemical cell which comprises a catalyst layer including a plurality of carbon black particles which support catalyst particles and a plurality of carbon black particles which support no catalysts and coated with a fluorinated polyolefin film (FPO/CB), the said two carbon black particles being bonded by means of polytetrafluoroethylene.

The first and a second processes of the present invention comprise adding PTFE, to either of catalyst-supporting carbon black or FPO/CB followed by drying, mixing this mixture with the other carbon black, applying the resulting mixture on a siubstrato such as carbon paper and forming a porous electrode having a catalyst layer on the substrate by pressing the substrate under heating.

A third process of this invention comprises adding PTFE to the mixture of the two above kinds of carbon black, applying the resulting mixture to a substrate and forming a porous electrode having a catalyst layor on the substrate by pressing the substrate under heating.

Since the carbon black employed for the formation of the gas network in the catalyst layer of the gas diffusion electrode having the above constitution in accordance with the present invention is completely hydrophobically treated, no electrolyte permeates this portion and the carbon black exhibits high hydrophobicity so that the wet-proofing is maintained even after the long operation period to onable the gas supply to the catalyst particles so as to provide the gas diffusion electrode with a long life and high electrode performance.

The non-catalyst-supporting carbon black particles are coatod with a fluorinated polyolefin film (FPO/CB) so that these particles are highly hydrophobic and suitable for forming a gas supply path among the particles. On the other band, the catalyst-supporting carbon black particles are free from the hydrophobic film so that those particles are high hydrophilic and suitable for forming an electrolyto supply path among the particles. The fluorinated polyolefin film is formed on the catalyst-non-supporting carbon black particles by forming a polyolefin film, preferably a polyethylene film, on the respective particles, and fluorinating the film, PTFE cannot be employed as a material for this film because the melt viscosity thereof is too high to be uniformly dispersed on the whole surface of the respective particles. On the other hand, the molt viscosity of the polyolefin is usually one or two orders less than that of PTFE so that the polyolefin film can uniformly be formed on the surface which is then fluorinated to form a uniform fluorinated polyolefin film.

While the above two typed of carbon black particles are required to be bound with each other for forming the catalyst layers the above fluorinated polyolefin materially equivalent to PTFE cannot be employed as a binding agent. But the bonding ability of the fluorinated polyolefin is much poorer than that of PTFE because it exists as au ultra thin film so that PTFE is employed as a binding agent.

In accordance with the processes of this invention, the above excellent gas diffusion electrode can be prepared with high accuracy and the mass production thereof may be suitably tarried out.

DETAILED DESCRIPTION OF THE INVENTION

Figure 1:
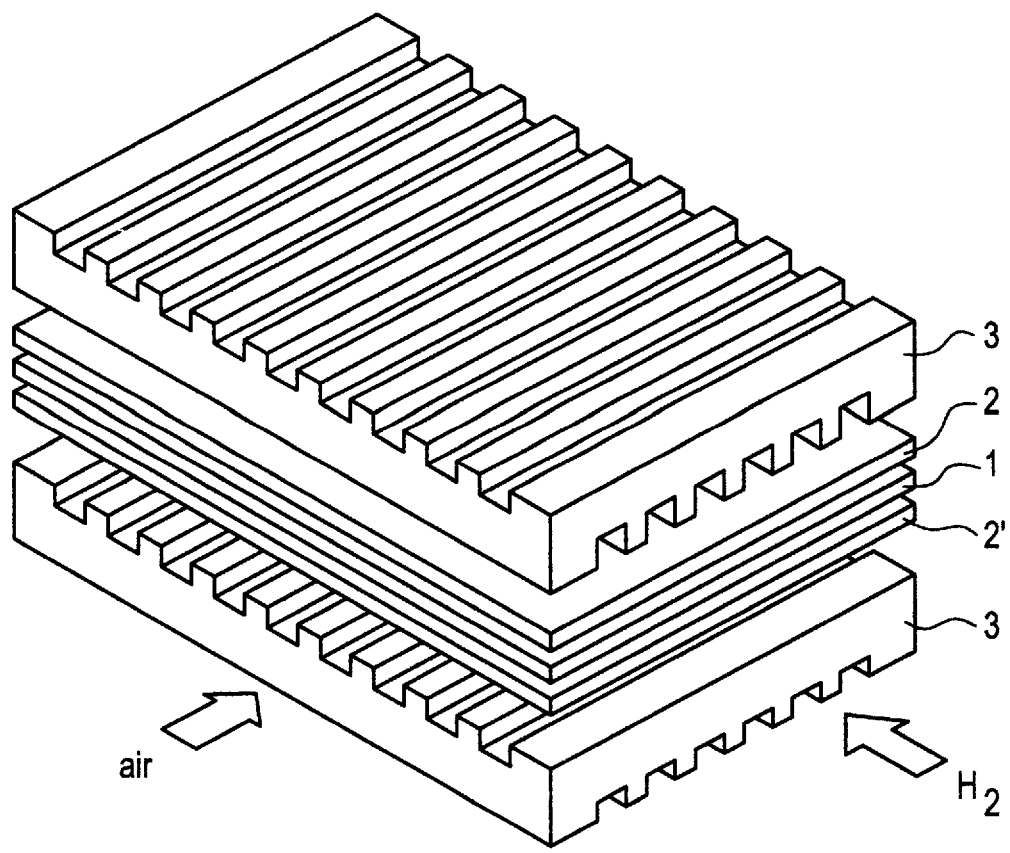
FIG. 1 is a broken perspective view showing one example of a convontional phosphoric acid type fuel cell.
Figure 2:
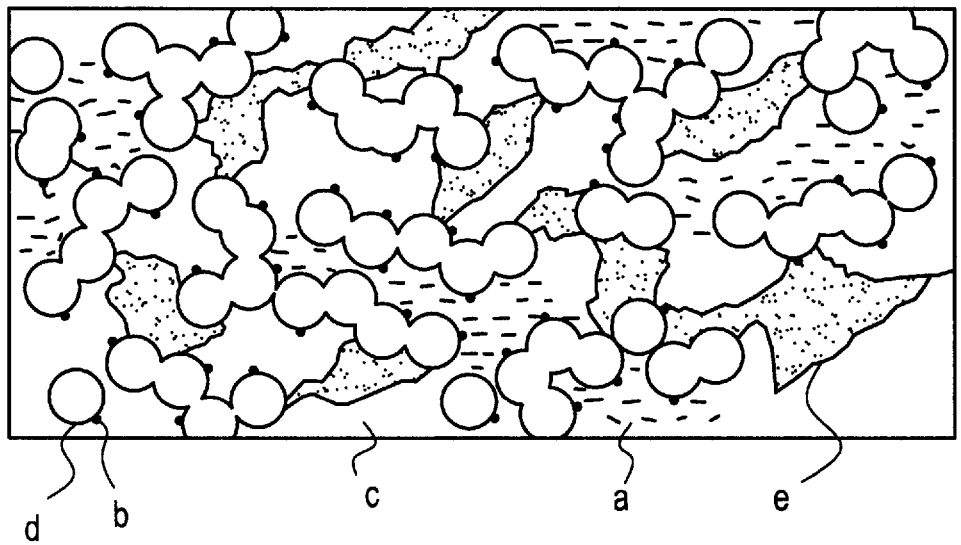
FIG. 2 is a schematic view showing a catalyst layer of a conventional gas diffusion electrode.
Figure 3:
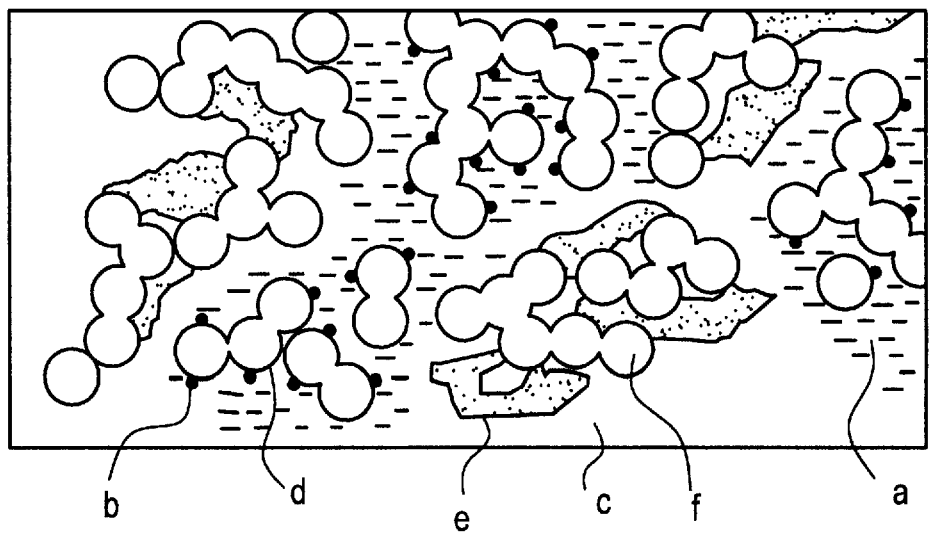
FIG. 3 is a schematic view showing a catalyst layer of another conventional gas diffusion electrode having a new structure.
Figure 4:
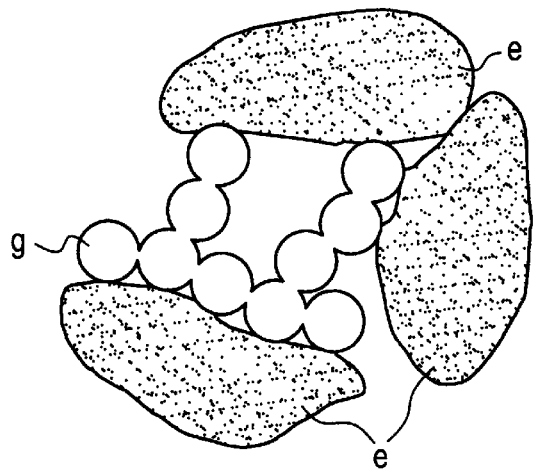
FIG. 4 is a schematic view showing a particle structure of conventional carbon black hydrophobioally treated with ordinary PTFE.
Figure 5:
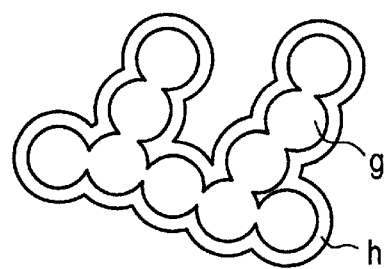
FIG. 5 is a schematic view showing a particle structure of conventional carbon black covered with a hydrophobic fluorinated compound thin layer.

The completely hydrophobic carbon black (non-catalyst-supporting carbon black) may be prepared as follows, Liquid which has been made by dispersing polyethylene having an average molecular weight of preferably between 100,000 and 500,000, most preferably around 250,000, in an organic solvent, and carbon black are mixed and dried. The mixture of the liquid and the carbon black is thermally treated so that the polyethylene is made to be a thin layer covering the surface of the carbon black. Thou the polyethylene is completely fluorinated at 60° C. by an excess of fluorine gas diluted with an inert gas to produce FPE/CB, Thus, the hydrophobic carbon black having approximately 50% in weight of fluorinated polyethylene (FPE/CB) is obtained.

Then, a mixed powder of this hydrophobic carbon black and, for example, a Pt-based alloy catalyst carbon black and PTFE in the form of, for example, its dispersion, is dispersed in a solvent. This dispersion is stirred to make a large agglomerate. The average particle size of this agglomerato preparod employing the catalyst-supported carbon black is 0.01 to 300 μm, preferably 0.1 to 10 μm. When an agglomerate is prepared employing the catalyst-non-supported carbon black, the average particle size thereof is 0.3 to 20 μm, preferably 0.6 to 5 μm. After this mixture is spread on such a substrate as carbon paper to form a catalyst layer thereon, the substrate is sintered to produce a porous gas diffusion electrode. In place of mixing the above three components at once, the two kinds of carbon black maybe mixed at first, and then PTFE may be added.

The average agglomerated sizes of the catalyst-supporting carbon black and FPO/CB are each 0.01 μm to 50 μm. preferably 0.1 μm to 10 μm. The average particle size of the PTFE is preferably 0.1 μm to 1 μm.

The weight ratio ranges of the two carbon blacks are each 8:2 to 2:8, preferably 7:3 to 3:7.

As mentioned, PTFE is added to the carbon black in the form of its dispersion for effective dispersion. The amount of PTFE with respect to 100 portions of the carbon black of the dry powder is not more than 70 portions, preferably 20 portions to 70 portions.

Figure 6:
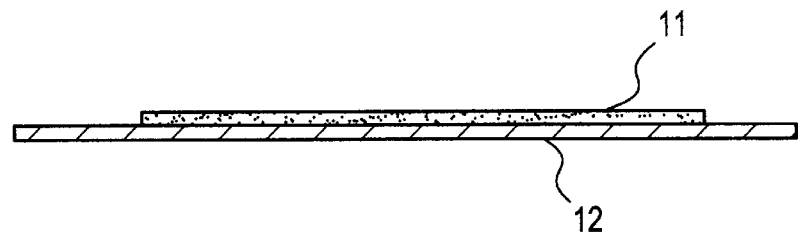
FIG. 6 is a schematic cross sectional view of one embodiment of a gas diffusion electrode of the present invention.

In one embodiment of this invention (shown in FIG. 6) prepared in accordance with the foregoing, a catalyst layer 11 consisting of catalyst-supporting carbon black, FPO/CB such as FPE/CB and PTFE is formed on the surface of carbon paper 12.

Figure 7:
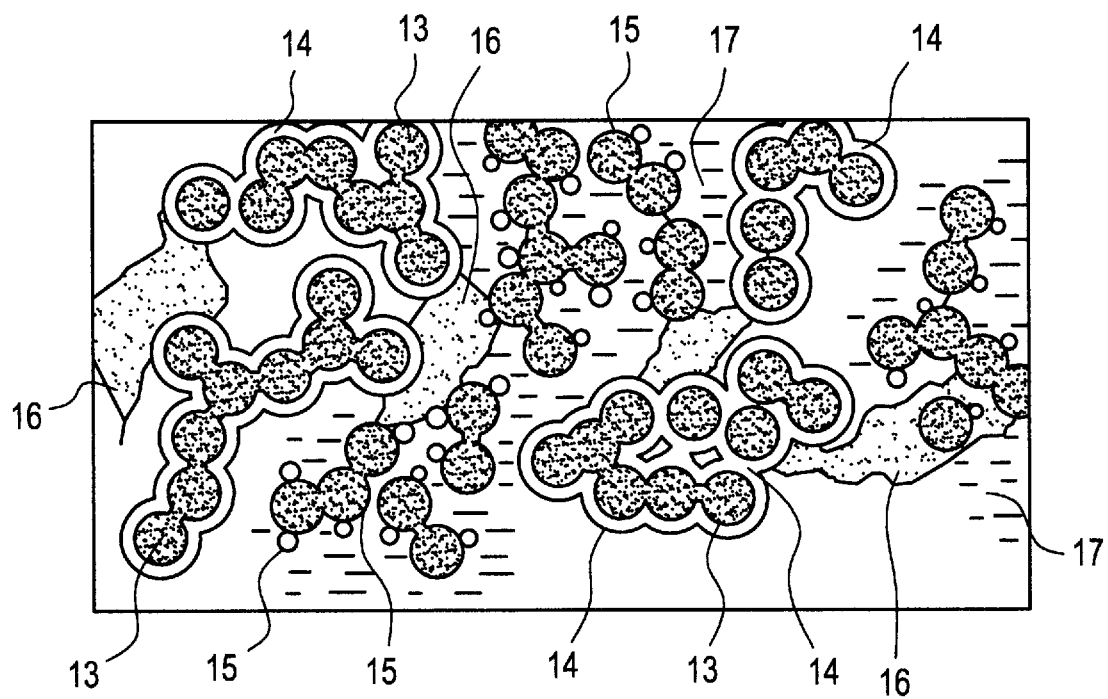
FIG. 7 is a schematic view showing one example of a catalyst layer in accordance with the present invention.

In FIG. 7, the most appropriate feature is shown in which all the non-catalyst-supporting carbon black particles 13 are coated with a fluorinated polyolefin film (FPE/CB) 14 to make it hydrophobic, and all the catalyst-supporting carbon black particles 15 are not coated with the film 14 to make it hydrophilic. Several large PTFE particles 16 are located for binding the above two carbon black particles to form agglomerates. In the example shown in FIG. 7, electrolyte supply paths 17 indicated by horizontal dotted lines are formed among the catalyst-supporting carbon black particles, and gas supply paths are formed among the fluorinated films of FPE/CB and the PTFE particles which are hydrophobic.

Even after a long period of operation time, tie hydrophobicity of the FPE/CB is maintained because of the presence of the fluorinated polyolefin film so that the electrolyte does not enter into the gas supply paths to provide a fuel cell having a long life.

EXAMPLES

Example 1

Liquid Which had been made by dispersing 2% in weight of commercially available polyethylene having an average molecular weight of 250,000 in n-hexane, and commercially available acetylene-based carbon black (primary average particle size: 40 nm specific surface area: 65 $M^2/g$, average particle size of agglomerate: 0.5 $\mu$m) were mixed and driod. Then the mixture was thermally treated so that the polyethylene was made to be a thin layer covering the surface of the carbon black (polyothylene: 30% in weight). Then the polyethylene was completely fluorinated at 60° C. by a fluorine gas of twice stoichiometric amount diluted with a nitrogen gas to produce FPE/CB. Thus, a hydrophobic carbon black having approximately 50% in weight of fluorinated polyethylene was obtained.

Then, a mixed powder of this hydrophobic carbon black and an available Pt-based alloy catalyst (20% in weight) on acetylene-based carbon black (primary average particle size: 30 nm, specific surface area: 300 $m^2/g$, average particle site of aggregate: 0.3 $\mu$m) and PTFE dispersion was dispersed in 500 ml of a mixed solvent of isopropanol/water (1:1) so that the total carbon black weight included in the mixed powder became 100 mg. The ratio was expressed as a weight ratio of all the carbon black to the fluorinated polyethylene which was permitted to change within the range between 10/3 and 10/9. Well-agglomerated particles were prepared by stirring the mixture. The amount of PTFE included was permitted to change within the range of 5 to 70 portions with respect to 100 portions of all the carbon black. After this mixture was spread on commercially available PAN-based carbon Paper (porosity: 70%. thickness: 0.4 mm) previously hydrophobically treated with 30% in weight of PTFE, which was then press-molded at 20 kg/cm², the mixture was sintered at 340° C. for 20 minutes in a nitrogen atmosphere furnace to produce a porous gas diffusion electrode for an anode or a cathode.

Figure 8:
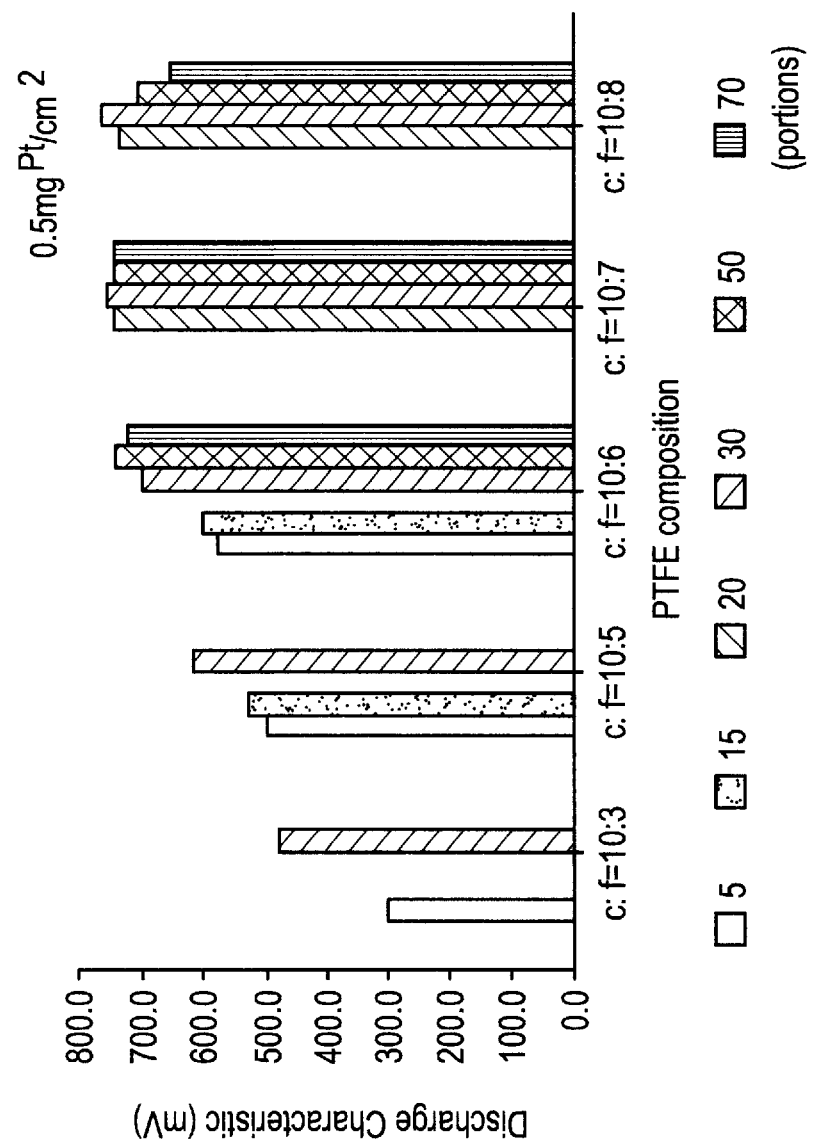
FIG. 8 is a graph showing the discharge characteristics of an air-hydrogen phosphoric acid cell at 200 mA/cm$^2$ employing the gas diffusion electrode of an Example of this invention.
Figure 9:
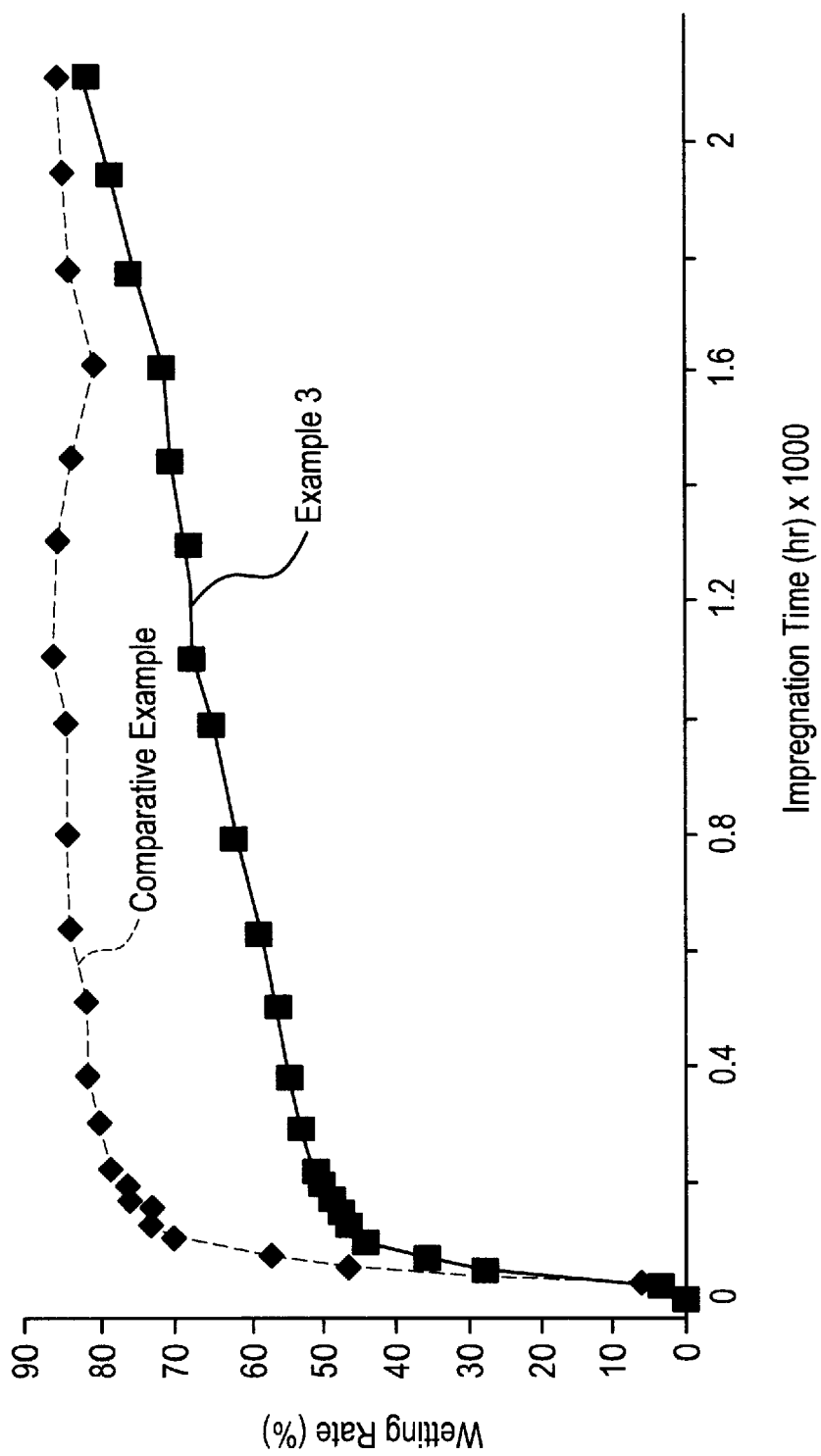
FIG. 9 is a graph showing the results of an accelerated wet test of the gas diffusion electrode prepared in an Example employed as a cathode to phosphoric acid.

The discharge characteristics of an air-hydrogen phosphoric acid type cell employing the gas diffusion electrode prepared in Example 1 is illustrated in FIG. 8. The maximum discharge characteristics were obtained in tile range between 10/6 and 10/8 of all the carbon black (c)/the fluorinated polyethylene (f) and in the range between 20 and 70 portions of PTFE with respect to 100 portions of all the carbon black.

Example 2

70 mg of the hydrophobic carbon black of Example 1 and PTFE disporsion were dispersed in 50 ml of a mixed solvent of isopropanol/water (1:1) [40 portions of PTFE in the form of disporsion (average particle size: 0.3 $\mu$m) with respect to 100 portions of the carbon black]. The mixed liquid was filtered, dried and reduced to powder. The average agglomerate size of this powder was adjusted to 1 $\mu$m. Thereafter, this powder and 36 mg of the above-mentioned commercially available catalyst powder were mixed by means of a blander. After the mixture was applied on PAN-based carbon paper hydrophobically treated in accordance with the procedures already mentioned, it was press-molded at 20 kg/cm² and further heated at 340° C. for 20 minutes in a nitrogen atmosphere furnace to produce a porous gas diffusion electrode.

Similar degrees of the-discharge characteristics to those of Example 1 were obtained in the gas diffusion electrode of Example 2.

Example 3

36 mg of the above-mentioned catalyst and PTFE dispersion were dispersed in 50 ml of a mixed solvent of isopropanol/water (1:1) (40 portions of PTFE with respect to 100 portions of the carbon black in the catalyst-supported carbon black). The resulting mixed liquid was filtered, driod and reduced to Powder. The average aggregate size of this powder was adjusted to 2 $\mu$m. Thereafter, this powder and 70 mg of the above-mentioned hydrophobic carbon black were mixed by means of a blender. After the mixture was applied on PAN-based carbon paper hydrophobically treated in accordance with the procedures already mentioned, it was press-molded at 20 kg/cm² and further heated at 340° C. for 20 minutes in a nitrogen atmosphere furnace to produce a porous gas diffusion electrode.

Similar degrees of the discharge characteristics to those of Example 1 were obtained in the gas diffusion electrode of Example 3.

These characteristics are superior to those of conventional ones by about 20 mV.

The results of an accelerated wet test of the gas diffusion electrode prepared in Example 3 employed as a cathode to phosphoric acid (205° C. 105%, $HaPO_4$) are shown in FIG. 8 together with the test results of a conventional gas diffusion electrode employed as a cathode in which only PTFE was employed as an agent providing hydrophobicity to the catalyst-supported carbon black. While not loss than 80% of the pores were filled with an electrolyte in 200 hours in the conventional electrode, the electrode of Example exhibited higher hydrophobicity than that of the conventional one even after 2000 hours. It is apparent that the wet-resistance is remarkably improved.

What is claimed is:

1. A gas diffusion electrode for an electrochemical cell comprising a catalyst layer integrated on a substrate, said catalyst layer being formed by binding a mixture of:

(a) catalyst-supported carbon black; and (b) catalyst-free carbon black containing a fluorinated polyolefin applied in the form of a dispersion to substantially the entire surface of the catalyst-free carbon black in a weight ratio of the amount of all carbon blacks present in (a) plus (b) to the fluorinated polyolefin in the range of 10:3 to 10:9.

2. The gas diffusion electrode of claim 1 wherein the weight ratio of the amount of all carbon blacks present in (a) plus (b) to the fluorinated polyolefin in the range of 10:6 to 10:8.

3. The gas diffusion electrode of claim 1 wherein the catalyst-supported carbon black and the catalyst-free carbon black are present in a weight ratio of 8:2 to 2:8.

4. The gas diffusion electrode of claim 3 wherein the catalyst-supported carbon black and the catalyst-free carbon black are present in a weight ratio of 7:3 to 3:7.

5. A gas diffusion electrode as claimed in claim 1, wherein the fluorinated polyolefin is fluorinated polyethylene.

* * * * *